(12) United States Patent
Kitamura et al.

(10) Patent No.: US 11,021,193 B2
(45) Date of Patent: Jun. 1, 2021

(54) SIDE RAIL AND MANUFACTURING METHOD FOR SIDE RAIL

(71) Applicant: TOYOTA JIDOSHA KABUSHIKI KAISHA, Toyota (JP)

(72) Inventors: Yoshiaki Kitamura, Miyoshi (JP); Gouta Yamane, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/157,396

(22) Filed: Oct. 11, 2018

(65) Prior Publication Data
US 2019/0111976 A1    Apr. 18, 2019

(30) Foreign Application Priority Data
Oct. 16, 2017    (JP) .............................. JP2017-200342

(51) Int. Cl.
| | |
|---|---|
| *B62D 21/15* | (2006.01) |
| *B62D 27/02* | (2006.01) |
| *B62D 21/02* | (2006.01) |
| *B23K 26/00* | (2014.01) |
| *B23K 26/24* | (2014.01) |
| *B62D 21/03* | (2006.01) |

(52) U.S. Cl.
CPC ........ *B62D 27/023* (2013.01); *B23K 26/0093* (2013.01); *B23K 26/24* (2013.01); *B62D 21/02* (2013.01); *B62D 21/15* (2013.01); *B62D 21/03* (2013.01)

(58) Field of Classification Search
CPC .... B23K 26/0093; B23K 26/24; B62D 21/15; B62D 27/023; B62D 21/02; B62D 21/03

USPC ......................................... 280/781, 786, 800
See application file for complete search history.

(56) References Cited

U.S. PATENT DOCUMENTS

| | | | | |
|---|---|---|---|---|
| 4,674,770 | A * | 6/1987 | Inagaki ................. | B62D 21/02 280/797 |
| 4,726,166 | A * | 2/1988 | DeRees ................. | B62D 21/02 52/694 |
| 6,189,930 | B1 * | 2/2001 | Kalazny ................ | B62D 21/02 280/781 |
| 6,398,260 | B1 * | 6/2002 | Rinehart ............... | B62D 21/02 280/781 |
| 6,733,040 | B1 * | 5/2004 | Simboli ................ | B62D 21/02 280/784 |
| 2005/0279049 | A1 | 12/2005 | MacKenzie et al. | |
| 2010/0045072 | A1 | 2/2010 | Yamada et al. | |
| 2011/0101735 | A1 | 5/2011 | Fujita | |

(Continued)

FOREIGN PATENT DOCUMENTS

| | | |
|---|---|---|
| CN | 101654119 A | 2/2010 |
| DE | 102010016945 B9 | 3/2012 |

(Continued)

*Primary Examiner* — Toan C To
(74) *Attorney, Agent, or Firm* — Sughrue Mion, PLLC

(57) ABSTRACT

A side rail includes a reinforcement region having a closed-section structure by base members and reinforcement plate members having a greater plate thickness than a plate thickness of the base members. In the reinforcement region, in a state in which the reinforcement plate members are fitted in fitting portions provided at positions corresponding to respective corner portions in the base members, the base members and the reinforcement plate members are joined to each other by laser welding.

5 Claims, 5 Drawing Sheets

(56) References Cited

U.S. PATENT DOCUMENTS

| | | | |
|---|---|---|---|
| 2014/0049033 A1* | 2/2014 | Yee | B62D 21/09 |
| | | | 280/797 |
| 2017/0291644 A1* | 10/2017 | Hasegawa | B62D 21/152 |
| 2018/0029645 A1 | 2/2018 | Von Watzdorf et al. | |
| 2018/0126435 A1 | 5/2018 | Egawa et al. | |
| 2019/0111973 A1* | 4/2019 | Onoda | B23K 26/24 |

FOREIGN PATENT DOCUMENTS

| | | |
|---|---|---|
| DE | 10 2016 114 068 B3 | 8/2017 |
| JP | 2005-132200 A | 5/2005 |
| JP | 2009-012626 A | 1/2009 |
| JP | 2009173110 A | 8/2009 |
| JP | 2017-095062 A | 6/2017 |
| JP | 2018-075612 A | 5/2018 |
| WO | 2009/004473 A2 | 1/2009 |
| WO | 2010/001847 A1 | 1/2010 |

* cited by examiner a a a a

SIDE RAIL AND MANUFACTURING METHOD FOR SIDE RAIL

INCORPORATION BY REFERENCE

The disclosure of Japanese Patent Application No. 2017-200342 filed on Oct. 16, 2017 including the specification, drawings and abstract is incorporated herein by reference in its entirety.

BACKGROUND

1. Technical Field

The present disclosure relates to a side rail extending along the longitudinal direction of a vehicle body and formed in a closed-section structure in a polygonal shape, and relates to a manufacturing method for this side rail.

2. Description of Related Art

Conventionally, for example, as disclosed in Japanese Patent Application Publication No. 2005-132200 and Japanese Patent Application Publication No. 2009-12626, a vehicle body frame of a truck, a bus, or the like includes a pair of right and left side rails (also referred to as side frames) extending in the longitudinal direction of a vehicle body, and cross members suspended between these side rails.

In the vehicle body frame of this type, it is desired to provide a solution for vibrations in the vertical direction (generally referred to as choppy ride) occurring in the vehicle body during traveling on a road having rough surfaces, or the like, for example.

As a solution for choppy ride in the related art, such a solution that enhances bending rigidity in the vertical direction of a vehicle body frame (particularly, side rails) can be listed. For example, the sectional shape of the side rail is enlarged, the plate thickness of an entire steel plate configuring the side rail is enlarged, or reinforcements are laid on and welded to the inner surfaces of the side rail. As another solution for choppy ride, such a solution that improves the cab mount structure for the sake of suppressing vibrations from being transmitted to the cabin can be listed. For example, the structure of mount rubbers is improved so as to enhance the vibration damping effect, or mount brackets with a larger size are used.

SUMMARY

Unfortunately, in order to enlarge the sectional shape of the side rail, it is required to secure a large space for arranging the side rail, which is disadvantageous in practical use. Such solutions that increase the plate thickness of the entire steel plate configuring the side rail, and that lay and weld the reinforcements onto the inner surfaces of the side rail might cause a great increase in weight of the vehicle body, which is not preferable. In addition, such a solution that improves the cab mount structure might cause a great increase in weight of the vehicle body or a great increase in cost for manufacturing the vehicle body, which is not preferable.

The present disclosure provides a side rail that can provide a solution for choppy ride without causing a great increase in weight of a vehicle body and a great increase in cost for manufacturing the vehicle body, and also provides a manufacturing method for this side rail.

A side rail according to the first aspect of the present disclosure includes: a plurality of base members extending in the longitudinal direction of a vehicle body of a vehicle, the base members having a closed-section structure in a polygonal shape having a plurality of corner portions; and reinforcement plate members having a greater plate thickness than a plate thickness of the base members. A part of a region in the longitudinal direction of the vehicle body of the side rail includes a reinforcement region having the closed-section structure in the polygonal shape constituted by the base members and the reinforcement plate members, and the reinforcement region includes joined parts where in a state in which the reinforcement plate members are fitted in fitting portions provided at positions corresponding to at least the respective corner portions in the base members, the base members and the reinforcement plate members are joined to each other.

According to the first aspect, in the reinforcement region of the side rail, at least the respective corner portions in the closed-section structure in a polygonal shape are configured by the reinforcement plate members. The plate thickness of the reinforcement plate members is set to be greater than that of the base members. Since the respective corner portions are configured by the reinforcement plate members in this manner, the bending rigidity in the vertical direction of the side rail can be enhanced, to thereby provide the solution for choppy ride. That is, it is possible to enhance the bending rigidity in the vertical direction of the side rail without enlarging the sectional shape of the side rail, increasing the plate thickness of the entire steel plate configuring the side rail, or laying and welding the reinforcement onto the inner surface of the side rail. Addition to this, it is unnecessary to improve the cab mount structure. Accordingly, it is possible to provide the solution for choppy ride without causing a great increase in weigh of the vehicle body and a great increase in cost for manufacturing the vehicle body.

The base members and the reinforcement plate members may be joined to each other by laser welding.

If the base members are joined to the reinforcement plate members by arc welding, welding spatters adhere on the vicinities of the welded portions, and oxided scales are present thereon due to thermal influence; consequently, it becomes difficult to apply a coating material when antirust coating is carried out, and thus it becomes difficult to obtain a high antirust effect. According to the above configuration, by employing the laser welding, it is possible to suppress occurrence of the spatters as well as oxided scales; therefore, the coating material is applied in a preferable manner, and thus it is possible to obtain a high antirust effect.

The reinforcement region may include: a first vertical wall portion and a second vertical wall portion that face each other in the horizontal direction; first horizontal wall portions and second horizontal wall portions that face each other in the vertical direction; and a plurality of the corner portions configuring boundary portions between the first and second vertical wall portions and the first and second horizontal wall portions, and in the reinforcement region, the reinforcement plate members may be applied throughout from the corner portions to the horizontal wall portions adjacent to the corner portions.

According to this configuration, while minimizing increase in weight of the vehicle body due to employment of the reinforcement plate members set to have a greater plate thickness than that of the base members, it is possible to effectively enhance the bending rigidity in the vertical direction of the side rail.

The side rail may include: a horizontal part extending in the horizontal direction along the longitudinal direction of the vehicle body within a predetermined range between an arrangement position of a front wheel of the vehicle and an arrangement position of a rear wheel of the vehicle; and a front curved part having a shape continued to a front end of the horizontal part and curved upward as the front curved part extends toward a frontward direction of the vehicle body. If the side rail includes a rear curved part having a shape continued to a rear end of the horizontal part and curved upward as rear curved part extends toward the rearward direction of the vehicle body, the reinforcement region may be provided in the horizontal part.

When vibrations in the vertical direction occurs in the vehicle body during traveling on the road having rough surfaces, or the like, a vibration node of the side rail is supposed to appear in the horizontal part. In the present embodiment, the reinforcement region is defined in the horizontal part that serves as the vibration node so as to increase the bending rigidity of the side rail, to thereby provide an effective solution for choppy ride.

The base members may be joined to the reinforcement plate members in such a manner that surfaces located outward in the closed-section structure among surfaces perpendicular to a plate thickness direction of the base members are flush with surfaces located outward in the closed-section structure among surfaces perpendicular to a plate thickness direction of the reinforcement plate members.

A manufacturing method for a side rail according to the second aspect of the present disclosure, includes: forming fitting portions in a plurality of base members in a flat-plate shape, the fitting portions being formed in regions to become at least corner portions in a reinforcement region that is previously defined; fitting, in the fitting portions, reinforcement plate members in a flat-plate shape having a greater plate thickness than a plate thickness of the base members; joining the reinforcement plate members fitted in the fitting portions to the base members; bending, together with the reinforcement plate members, the base members to which the reinforcement plate members are joined so as to form a plurality of rail members having the corner portions; and integrally joining the plurality of rail members to each other so as to form a closed-section structure in a polygonal shape by the plurality of rail members.

Accordingly, it is possible to provide the manufacturing method for the side rail capable of providing the solution for choppy ride without causing a great increase in weigh of the vehicle body, and a great increase in cost for manufacturing the vehicle body.

In addition, the reinforcement plate members may be joined to the base members by laser welding.

As described above, employment of the laser welding suppresses occurrence of the spatters and oxided scales; therefore, the coating material can be applied in a preferable manner, and thus it is possible to obtain a high antirust effect of the antirust coating.

In the present disclosure, the reinforcement region of the side rail is provided with joined portions where the base members and the reinforcement plate members are joined to each other in a state in which the reinforcement plate members are fitted in the fitting portions provided at the position corresponding to at least the respective corner portions of the base members. Accordingly, it is possible to provide a solution for choppy ride without causing a great increase in weight of a vehicle body and a great increase in cost for manufacturing the vehicle body.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the present disclosure will be described with reference to the drawings. In the present embodiment, description will be provided on the case in which the present disclosure is applied to a side rail of a vehicle body frame configured as a rudder frame applied to a pickup truck or the like.

Outline of Structure of Vehicle Body Frame

Figure 1:
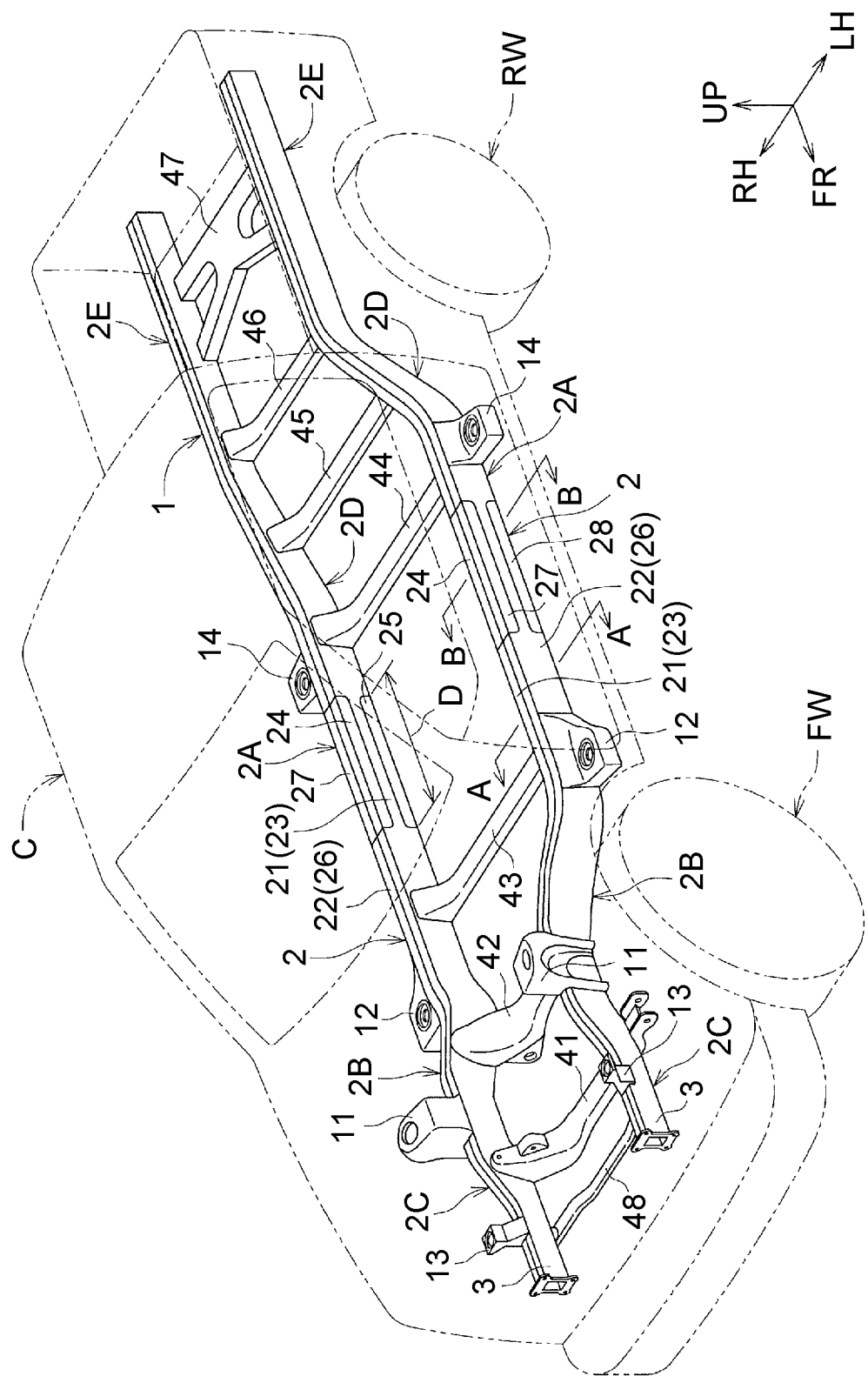
FIG. 1 is a perspective view showing vehicle body frames according to an embodiment.
Figure 2:
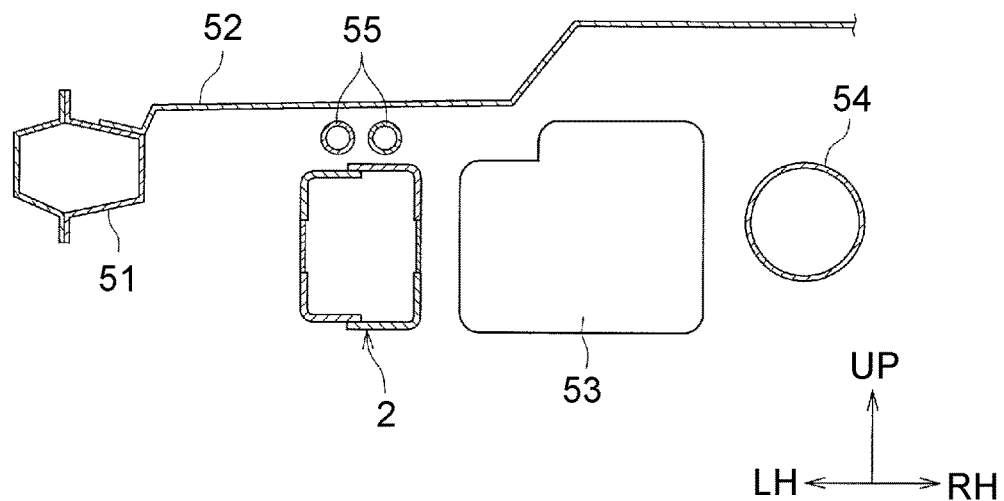
FIG. 2 is a sectional view of a vehicle at a position corresponding to line B-B in FIG. 1.

FIG. 1 is a perspective view showing a vehicle body frame 1 according to the present embodiment. In FIG. 1, the vehicle body frame 1 is indicated by solid lines, a cabin C and wheels FW, RW are indicated by imaginary lines. FIG. 2 is a sectional view of the vehicle at a position corresponding to line B-B in FIG. 1. In each drawing, an arrow FR indicates a frontward direction, an arrow UP indicates an upward direction, an arrow RH indicates a rightward direction, and an arrow LH indicates a leftward direction, respectively.

As shown in FIG. 1, the vehicle body frame 1 includes a pair of right and left side rails 2 located at both outer sides in the vehicle width direction and extending in the longitudinal direction of the vehicle body. Each of these side rails 2 includes an intermediate part 2A continuously extending along the longitudinal direction of the vehicle body, a front kick part 2B, a front part 2C, a rear kick part 2D, and a rear part 2E.

The intermediate part 2A horizontally extends along the longitudinal direction of the vehicle body within a predetermined range between an arrangement position of the vehicle front wheel FW and an arrangement position of the vehicle rear wheel RW. This intermediate part 2A corresponds to a horizontal part. The front kick part 2B has a shape continued to the front end of the intermediate part 2A and gradually curved upward as the front kick part extends toward the frontward direction of the vehicle body. This front kick part 2B corresponds to a front curved part. The front part 2C is continued to the front end of the front kick part 2B and extends in the frontward direction of the vehicle body. The vehicle front wheel FW is disposed outward in the vehicle width direction of the front part 2C. Hence, the dimension in the vehicle width direction between the respective front parts 2C of the side rails 2 (dimension between the right and left side rails 2) is set to be shorter than the dimension in the vehicle width direction between the respective intermediate parts 2A of the side rails 2 in consideration with interference with the vehicle front wheels FW.

The rear kick part 2D has a shape continued to the rear end of the intermediate part 2A and gradually curved upward as the rear kick part extends toward the rearward direction of the vehicle body. This rear kick part 2D corresponds to a rear curved part. The rear part 2E is continued to the rear end of the rear kick part 2D and extends to the rearward direction of the vehicle body. The vehicle rear wheel RW is disposed outward in the vehicle width direction of this rear part 2E. Hence, the dimension in the vehicle width direction between the respective rear parts 2E of the side rails 2 (dimension between the right and left side rails 2) is set to be shorter than the dimension in the vehicle width direction between the respective intermediate parts 2A of the side rails 2 in consideration with interference with the vehicle rear wheels RW.

The respective arrangement heights of the front part 2C and the rear part 2E of each side rail 2 are set in consideration with the arrangements of a not-illustrated suspension unit and others.

Crash boxes 3 for absorbing energy (collision load) at the time of a vehicle frontal collision are disposed respectively in front of the respective front parts 2C of the pair of the right and left side rails 2. At the front ends of the pair of the right and left crash boxes 3, a bumper reinforcement (not illustrated) is suspended to extend in the vehicle width direction. It may be structured that the crash boxes 3 are not provided between the front ends of the side rails 2 and the bumper reinforcement, but the bumper reinforcement is directly suspended between the front ends of the side rails 2.

Between the side rails 2, a plurality of cross members 41, 42, 43, 44, 45, 46, 47 extending in the vehicle width direction are suspended. Therefore, the vehicle body frame 1 of the present embodiment is configured as a rudder frame (rudder-like frame). The cross member 41 is suspended between the front parts 2C, 2C of the side rails 2, and the cross member 42 is suspended between the front ends of the front kick part 2B. The cross member 43 is suspended between the intermediate parts 2A. The cross member 44 is suspended between the front ends of the rear kick parts 2D. The cross member 45 is suspended between the rear kick parts 2D. The cross member 46 is suspended between the rear ends of the rear kick parts 2D. The cross member 47 is suspended between the rear parts 2E. A front coupling part 48 is suspended between the side rails 2 at a more frontward position of the vehicle body than the cross member 41.

Between the cross members 41 and the cross members 42 in the front parts 2C of the side rails 2, suspension mount brackets 11 made of metal and projecting outward in the vehicle width direction are disposed. A not-illustrated suspension mount is attached to each of the suspension mount brackets 11, and the suspension unit is coupled to the side rails 2 via the suspension mounts and the suspension mount brackets 11.

Cab mount brackets 12, 13, 14 are disposed respectively to the rear end of the front kick part 2B of each side rail 2, the front end of the front part 2C of each side rail 2, and the front end of the rear kick part 2D of each side rail 2. The cab mount brackets 12, 13, 14 project outward in the vehicle width direction, and not-illustrated cab mounts are attached to the cab mount brackets 12, 13, 14. The cabin C is coupled to the side rails 2 via the cab mounts and the cab mount brackets 12, 13, 14.

As shown in FIG. 2, a rocker 51 formed in a closed-section structure is disposed at a position more outward in the vehicle width direction (leftward in FIG. 2) than each side rail 2, and the end (end located outward in the vehicle width direction) of a floor panel 52 is connected to an upper surface of this rocker 51. A fuel tank 53 is disposed more inward (rightward in FIG. 2) in the vehicle width direction than the side rail 2. In FIG. 2, a reference numeral 54 indicates a propeller shaft extending from a not-illustrated transmission toward the vehicle rear wheel RW, and a reference numeral 55 indicates piping of the fuel supply system and others.

Structure of Side Rail

Next, the side rails 2 that characterize the present embodiment will be described. Each of the side rails 2 has the same configuration (right-left symmetric structure), and thus the side rail 2 on the left side in the vehicle width direction will be exemplified in this case.

In the side rail 2 according to the present embodiment, a part of a region of the intermediate part 2A is defined as a reinforcement region (region within a range indicated by D in FIG. 1). Specifically, in the intermediate part 2A, regions located between a position more slightly frontward than the center position in the longitudinal direction of the vehicle body and the rear end position of the intermediate part 2A are defined as the reinforcement region D, and this reinforcement region D is set to have a higher strength than those of the other regions in the side rail 2.

Figure 3A:
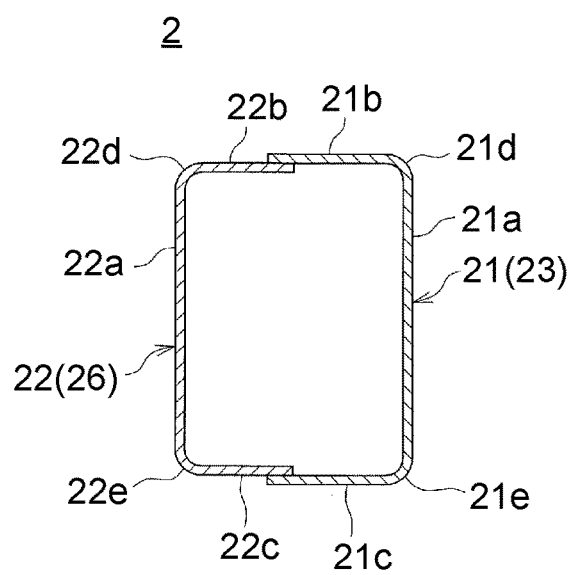
FIG. 3A is a sectional view of a side rail at a position taken along line A-A in FIG. 1.
Figure 3B:
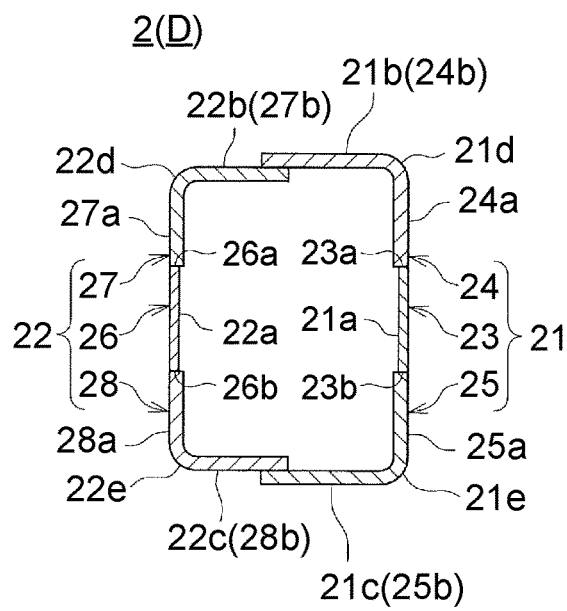
FIG. 3B is a sectional view of a side rail at a position taken along line B-B in FIG. 1.

FIG. 3A is a sectional view of the side rail 2 at a position taken along line A-A in FIG. 1, and FIG. 3B is a sectional view of the side rail 2 at a position taken along line B-B in FIG. 1. That is, FIG. 3A is a sectional view of a region deviating from the reinforcement region D, the region being included in the front portion of the intermediate part 2A. The side rail 2 is configured by two base members 23, 26 alone in the front portion of the intermediate part 2A. FIG. 3B is a sectional view of the reinforcement region D, which is a region in the rear portion of the intermediate part 2A. In this rear portion of the intermediate part 2A, the side rail 2 is configured by the two base members 23, 26 that form the main body of the side rail, and also by four reinforcement plate member 24, 25, 27, 28. Each of the base members 23, 26 and the reinforcement plate member 24, 25, 27, 28 is formed by a hot-rolled steel sheet. Each part of the side rail will be specifically described, hereinafter.

Structure of Front Portion of Intermediate Part 2A

The front portion (region deviating from the reinforcement region D) of the intermediate part 2A shown in the sectional view of FIG. 3A is a portion formed in the basic structure of the side rail 2, and is configured in a closed-section structure by integrally joining an inner rail member (inner channel) 21 composing an inner part in the vehicle width direction, and an outer rail member (outer channel) 22 composing an outer part in the vehicle width direction, by arc welding. In this portion, the inner rail member 21 and the outer rail member 22 are formed respectively by the base members 23, 26 alone. These base members 23, 26 have the same plate thickness dimension, and are made of the same material. For example, a member having a plate thickness dimension of approximately 3.0 mm and a tensile strength of approximately 600 MPa is employed. These values are not limited to the above values, but any members may be employed as far as they can secure a sufficient strength (vehicle body strength) as the side rail 2.

Specifically, the inner rail member 21 (base member 23) is formed in a sectional shape including: a vertical wall portion 21*a* extending in the vertical direction; an upper horizontal wall portion 21*b* and a lower horizontal wall portion 21*c* that are first and second horizontal wall portions, which face each other in the vertical direction and extend in the horizontal direction; an upper corner portion 21*d* composing a boundary portion between the vertical wall portion 21*a* and the upper horizontal wall portion 21*b*; and a lower corner portion 21*e* composing a boundary portion between the vertical wall portion 21*a* and the lower horizontal wall portion 21*c*.

The outer rail member 22 (base member 26) is formed in a sectional shape including: a vertical wall portion 22*a* extending in the vertical direction; an upper horizontal wall portion 22*b* and a lower horizontal wall portion 22*c* that are first and second horizontal wall portions, which face each other in the vertical direction and extend in the horizontal direction; an upper corner portion 22*d* composing a boundary portion between the vertical wall portion 22*a* and the upper horizontal wall portion 22*b*; and a lower corner portion 22*e* composing a boundary portion between the vertical wall portion 22*a* and the lower horizontal wall portion 22*c*.

The lower surface of the upper horizontal wall portion 21*b* of the inner rail member 21 is laid on the upper surface of the upper horizontal wall portion 22*b* of the outer rail member 22, and they are both joined to each other by arc welding. Similarly, the upper surface of the lower horizontal wall portion 21*c* of the inner rail member 21 is laid on the lower surface of the lower horizontal wall portion 22*c* of the outer rail member 22, and they are both joined to each other by arc welding. Accordingly, the side rail 2 is configured in the closed-section structure in a generally rectangular shape. In this manner, the closed-section structure (basic structure of the side rail 2), formed by arc-welding the inner rail member 21 and the outer rail member 22 that are formed respectively by the base members 23, 26 alone to each other, is employed not only in the front portion of the intermediate part 2A but also in the entire of the side rail 2 excluding the rear portion (reinforcement region D) of the above-described intermediate part 2A.

Structure of Rear Portion of Intermediate Part 2A

The present embodiment is characterized by the rear portion (reinforcement region D of which section is shown in FIG. 3B) of the intermediate part 2A.

Figure 4A:
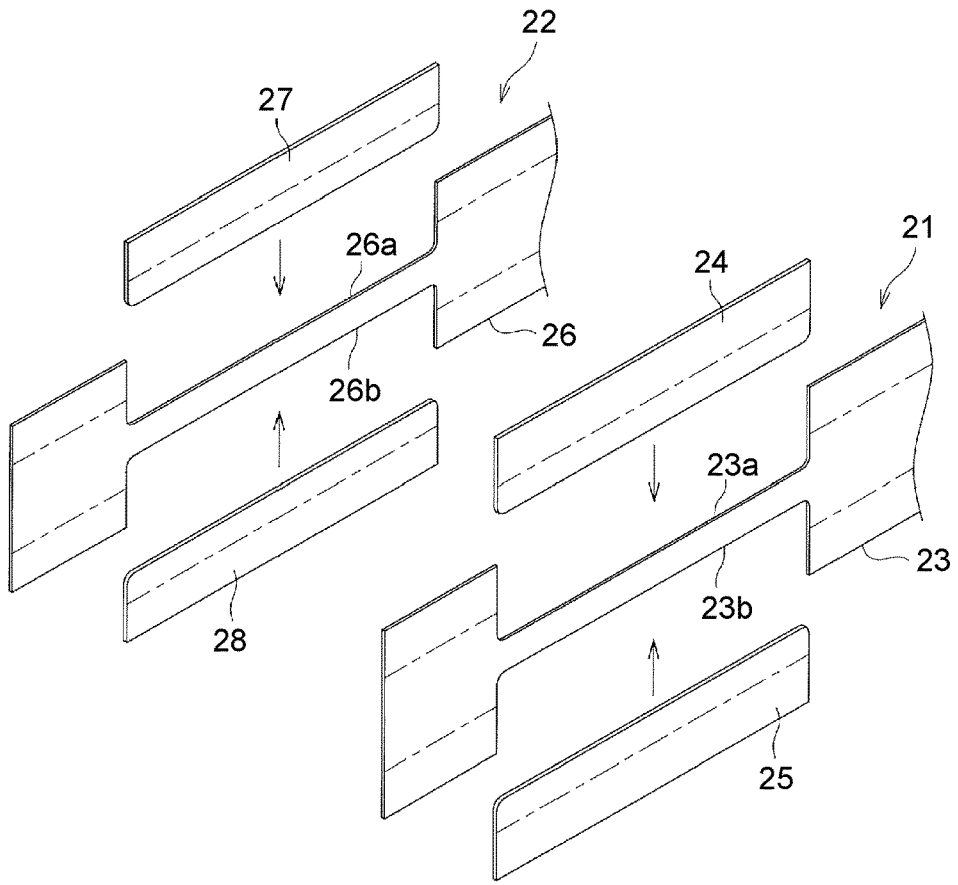
FIG. 4A is a view explaining a manufacturing process of the side rail according to the embodiment.
Figure 4B:
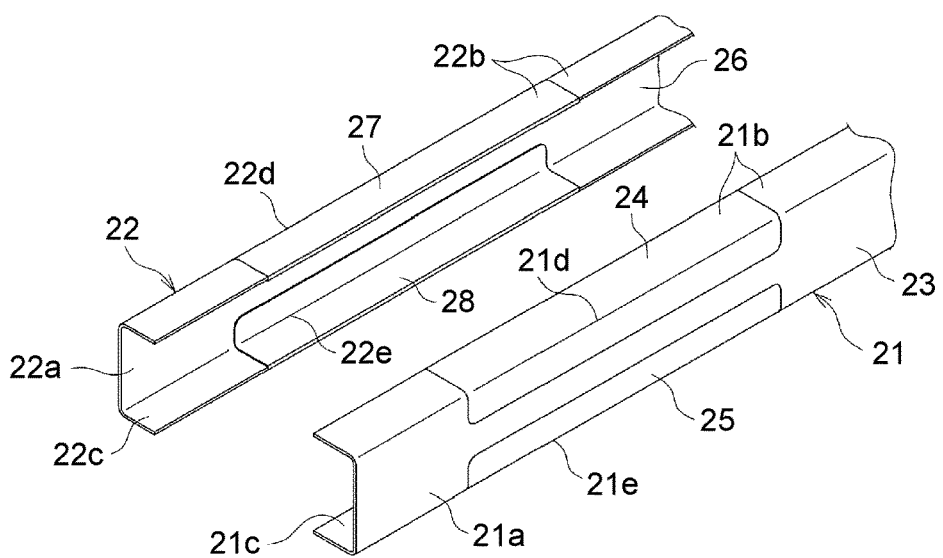
FIG. 4B is a view explaining the manufacturing process of the side rail according to the embodiment.

The structure of the rear portion (reinforcement region D) of the intermediate part 2A will be described with reference to FIG. 3B. FIG. 4A, 4B are drawings explaining the manufacturing process of each side rail 2, and show the rear portion (reinforcement region D) of this intermediate part 2A and the vicinity thereof.

As shown in FIG. 3B, the rear portion of the intermediate part 2A is configured in a closed-section structure by integrally joining six panel members 23, 24, 25, 26, 27, 28. Specifically, the rear portion (reinforcement region D) of the intermediate part 2A is configured by integrally joining: the base member 23 of the inner rail member 21; a first reinforcement plate member 24 and a second reinforcement plate member 25 respectively fitted in cutouts (fitting portions) 23*a*, 23*b* formed in the base member 23 (see FIG. 4A) and joined to the base member 23 by laser welding; the base member 26 of the outer rail member 22; and a third reinforcement plate member 27 and a fourth reinforcement plate member 28 fitted in cutouts (fitting portions) 26*a*, 26*b* formed in the base member 26 and joined to the base member 26 by laser welding.

The material of the base members 23, 26 and the material of the reinforcement plate members 24, 25, 27, 28 are the same as each other. For example, a material having a tensile strength of approximately 600 MPa is employed as this material. To the contrary, as the plate thickness dimension of the reinforcement plate members 24, 25, 27, 28, a plate thickness dimension greater than that of the base members 23, 26 is employed. Specifically, while the plate thickness dimension of the base members, 23, 26 is set to be approximately 3.0 mm, the plate thickness dimension of the reinforcement plate members 24, 25, 27, 28 is set to be approximately 4.5 mm (one and a half times the plate thickness dimension of the base members 23, 26). These values are not limited to the above values.

Specifically, in the manufacturing process of the reinforcement region D of the side rail 2, as shown in FIG. 4A, the base member 23 of the inner rail member 21 in a flat-plate shape is partially cut out (at the upper edge and the lower edge) so as to be formed with cutouts 23*a*, 23*b* (step of forming the base member in a flat-plate shape with the fitting portions in at least respective regions to become the corner portions in the reinforcement region previously defined in the side rail); and the first reinforcement plate member 24 and the second reinforcement plate member 25 having respective shapes generally coinciding with the shapes of the cutouts 23*a*, 23*b* are respectively fitted into the cutouts 23*a*, 23*b* (fitted into the respective cutouts 23*a*, 23*b* such that the respective end edges thereof are butted to each other; step of fitting the reinforcement plate members having a greater plate thickness dimension than that of the base members into the fitting portions of the base members). Then, the respective butt parts between the inner edges of these cutouts 23*a*, 23*b* and the outer edges of the first reinforcement plate member 24 and the second reinforcement plate member 25 are joined to each other by laser welding (step of joining the reinforcement plate members fitted in the fitting portions to the base members). Thereafter, the inner rail member 21 in a flat-plate shape is bent at its both end portions in the width direction (in the vertical direction in FIG. 4A) by pressing (bent portions are indicated by one dot chain lines), to thereby form the respective horizontal wall portions 21*b*, 21*c*, and the inner rail member 21 is thus produced (see FIG. 4B; step of bending, together with the reinforcement plate members, the base member to which the reinforcement plate members are joined, to thereby produce a rail member having the corner portions). Note that the production of the inner rail member 21 composing the rear portion (reinforcement region D) of this intermediate part 2A is carried out simultaneously with the production of the front end portion of the aforementioned intermediate part 2A.

As the laser welding, such laser welding that uses a carbon dioxide laser, a YAG laser, a fiber laser, or the like, may be applicable.

In the above manner, the inner rail member 21 is formed in a sectional shape having the vertical wall portion 21*a*, the upper horizontal wall portion 21*b*, the lower horizontal wall portion 21*c*, the upper corner portion 21*d*, and the lower corner portion 21*e*, as described above. In the reinforcement region D, the first reinforcement plate member 24 is applied throughout from the upper corner portion 21*d* to the upper horizontal wall portion 21*b* adjacent to the upper corner portion 21*d*, and the second reinforcement plate member 25 is applied throughout from the lower corner portion 21e to the lower horizontal wall portion 21c adjacent to the lower corner portion 21e.

Similarly, as shown in FIG. 4A, the base member 26 of the outer rail member 22 in a flat-plate shape is partially cut out (at the upper edge and the lower edge) so as to be formed with cutouts 26a, 26b (step of forming the base member in a flat-plate shape with the fitting portions in at least respective regions to become the corner portions in the reinforcement region previously defined in the side rail); and the third reinforcement plate member 27 and the fourth reinforcement plate member 28 having respective shapes generally coinciding with the shapes of the cutouts 26a, 26b are fitted into the respective cutouts 26a, 26b (step of fitting the reinforcement plate members having a greater plate thickness dimension than that of the base members into the fitting portions of the base members). Then, the respective butt parts between the inner edges of these cutouts 26a, 26b and the outer edges of the third reinforcement plate member 27 and the fourth reinforcement plate member 28 are joined to each other by laser welding (step of joining the reinforcement plate members fitted in the fitting portions to the base members). Thereafter, the outer rail member 22 in a flat-plate shape is bent at its both end portions in the width direction (in the vertical direction in FIG. 4A) by pressing (bent portions are indicated by one dot chain lines), to thereby form the respective horizontal wall portions 22b, 22c, and the outer rail member 22 is thus produced (step of bending, together with the reinforcement plate members, the base member to which the reinforcement plate members are joined, to thereby produce the rail member having the corner portions). Note that the production of the outer rail member 22 composing the rear portion (reinforcement region D) of this intermediate part 2A is also carried out simultaneously with the production of the front end portion of the aforementioned intermediate part 2A.

In the above manner, the outer rail member 22 is also formed in a sectional shape having the vertical wall portion 22a, the upper horizontal wall portion 22b, the lower horizontal wall portion 22c, the upper corner portion 22d, and the lower corner portion 22e, as described above. In the reinforcement region D, the third reinforcement plate member 27 is applied throughout from the upper corner portion 22d to the upper horizontal wall portion 22b adjacent to the upper corner portion 22d, and the fourth reinforcement plate member 28 is applied throughout from the lower corner portion 22e to the lower horizontal wall portion 22c adjacent to the lower corner portion 22e.

The lower surface of the upper horizontal wall portion 21b (the upper horizontal wall portion 21b formed by the first reinforcement plate member 24) of the inner rail member 21 is laid on the upper surface of the upper horizontal wall portion 22b (the upper horizontal wall portion 22b formed by the third reinforcement plate member 27) of the outer rail member 22, and they are both joined to each other by arc welding. Similarly, the upper surface of the lower horizontal wall portion 21c (the lower horizontal wall portion 21c formed by the second reinforcement plate member 25) of the inner rail member 21 is laid on the lower surface of the lower horizontal wall portion 22c (the lower horizontal wall portion 22c formed by the fourth reinforcement plate member 28) of the outer rail member 22, and they are both joined to each other by arc welding. In this manner, the side rail 2 is configured in the closed-section structure in a generally rectangular shape.

In the state in which the side rail 2 is configured in the closed-section structure in a generally rectangular shape in the above manner, the vertical wall portion 21a and the vertical wall portion 22a correspond to "a first vertical wall portion and a second vertical wall portion that face each other in the horizontal direction". The upper horizontal wall portions 21b, 22b and the lower horizontal wall portions 21c, 22c correspond to "first horizontal walls and second horizontal walls that face each other in the vertical direction". In addition, the respective corner portions 21d, 21e, 22d, 22e correspond to "a plurality of corner portions configuring boundary portions between the respective wall portions".

As described above, in the present embodiment, the plate thickness dimension of the respective reinforcement plate members 24, 25, 27, 28 is set to be greater than the plate thickness dimension of the base members 23, 26. Hence, in the respective butt parts where the respective outer edges of the vertical wall portions 24a, 25a, 27a, 28a (portions composing parts of the vertical wall portions 21a, 22a of the rail members 21, 22) and the respective outer edges of the horizontal wall portions 24b, 25b, 27b, 28b (portions composing the respective horizontal wall portions 21b, 22b, 21c, 22c of the rail members 21, 22) of the reinforcement plate members 24, 25, 27, 28 are butted to the respective inner edges of the cutouts 23a, 23b, 26a, 26b of the base members 23, 26, the respective outer surfaces of the base members 23, 26 and the respective outer surfaces of the reinforcement plate members 24, 25, 27, 28 are butted to each other so as to be flush with each other. That is, the above inner edges and the above outer edges are both so arranged as to be butted to each other such that the respective inner surfaces of the reinforcement plate members 24, 25, 27, 28 project inward (by a difference in plate thickness between the both) from the respective inner surfaces of the base members 23, 26.

As described above, the reinforcement region D of the side rail 2, formed in the closed-section structure in a polygonal shape having the plurality of corner portions 21d, 21e, 22d, 22d, includes the joined parts formed such that with the reinforcement plate members 24, 25, 27, 28 respectively fitted in the cutouts 23a, 23b, 26a, 26b arranged at the positions corresponding to at least the corner portions 21d, 21e, 22d, 22e in the base members 23, 26, the base members 23, 26 are joined to the reinforcement plate members 24, 25, 27, 28 by laser welding.

Advantageous Effect of Embodiment

As described above, in the present embodiment, in the reinforcement region D of each side rail 2, at least the respective corner portions 21d, 21e, 22d, 22e are configured by the reinforcement plate members 24, 25, 27, 28 in the closed-section structure of the polygonal shape. These reinforcement plate members 24, 25, 27, 28 are set to have a greater plate thickness dimension than that of the base members 23, 26. In this manner, the respective corner portions 21d, 21e, 22d, 22e are configured by the reinforcement plate members 24, 25, 27, 28, respectively, to thereby increase the bending rigidity in the vertical direction of each side rail 2, thus providing a solution for choppy ride.

FIG. 5A to FIG. 5D are sectional views of various side rails a according to the related art.

Figure 5A:
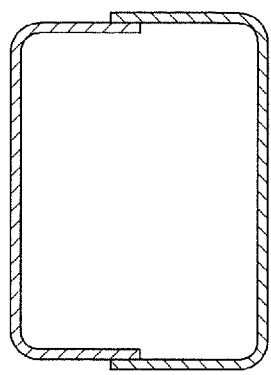
FIG. 5A is a sectional view of one of various side rails according to the related art.

FIG. 5A shows a side rail a with no reinforcement. In this side rail a, its bending rigidity in the vertical direction is so low that it is difficult to suppress vibrations from being transmitted to the cabin.

Figure 5B:
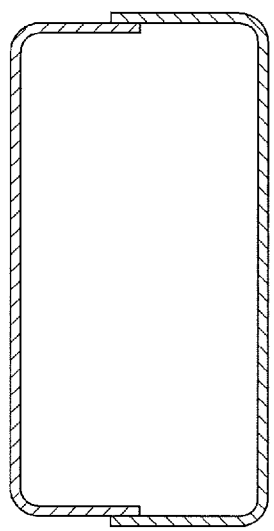
FIG. 5B is a sectional view of one of the various side rails according to the related art.

FIG. 5B shows a side rail a having an enlarged sectional shape. In this case, it is necessary to secure a larger space for arranging the side rail a, which is disadvantageous in practical use.

Figure 5C:
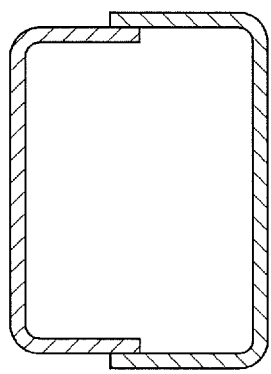
FIG. 5C is a sectional view of one of the various side rails according to the related art.

FIG. 5C shows a side rail a having a greater plate thickness of the entire steel plate composing the side rail a. This side rail a causes a great increase in weight of the vehicle body, which is not preferable.

Figure 5D:
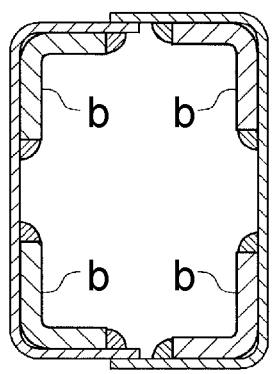
FIG. 5D is a sectional view of one of the various side rails according to the related art.

FIG. 5D shows a side rail "a" in which reinforcements "b" are laid on and joined to the inner surfaces of the side rail. This side rail "a" also causes a great increase in weight of the vehicle body, which is not preferable.

In the present embodiment, as described above, in the reinforcement region D of each side rail 2, at least the respective corner portions 21d, 21e, 22d, 22e are configured by the reinforcement plate members 24, 25, 27, 28, respectively, in the closed-section structure in the polygonal shape. These reinforcement plate members 24, 25, 27, 28 are set to have a greater plate thickness dimension than that of the base members 23, 26. Accordingly, it is possible to enhance the bending rigidity in the vertical direction of the side rail 2 without increasing the sectional shape of the side rail (see the side rail shown in FIG. 5B), increasing the plate thickness dimension of the entire steel plate configuring the side rail (see the side rail shown in FIG. 5C), or laying and welding the reinforcements onto the inner surfaces of the side rail (see the side rail shown in FIG. 5D). It is unnecessary to improve the cab mount structure. Accordingly, it is possible to provide the solution for choppy ride without causing a great increase in weight of the vehicle body as well as a great increase in cost for manufacturing the vehicle body.

Figure 6:
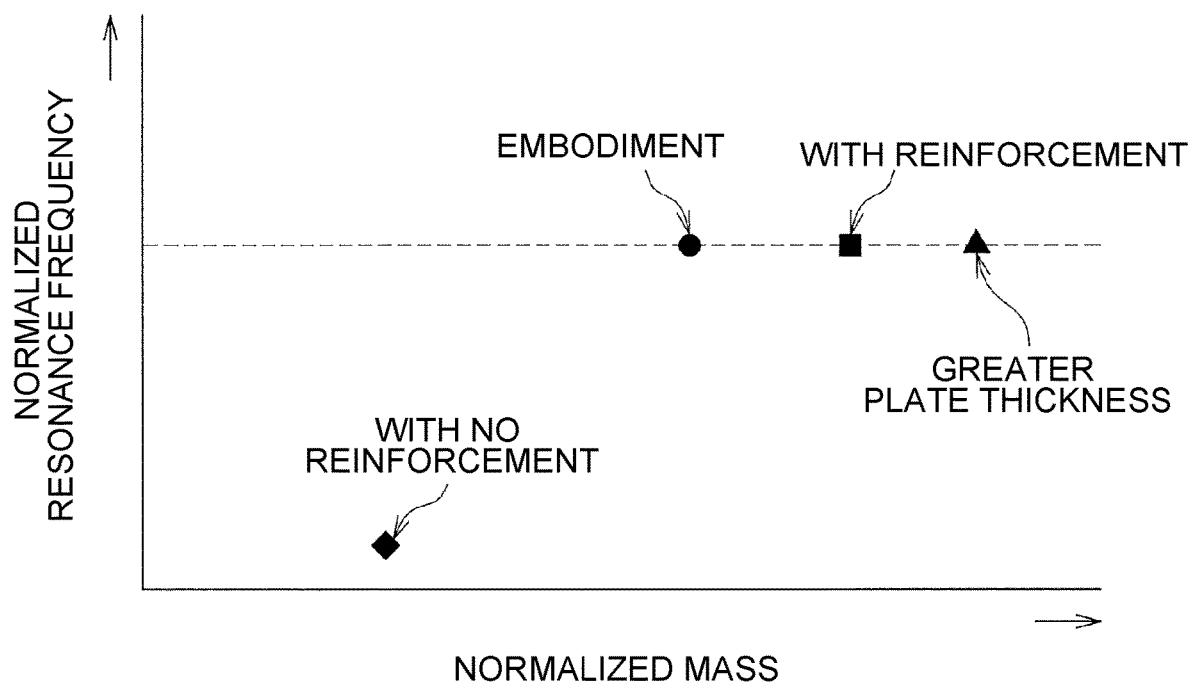
FIG. 6 is a drawing showing relations between the normalized resonance frequency and the normalized mass of the side rail according to the present embodiment and of the various side rails according to the related art.

FIG. 6 is a drawing showing relations between the normalized resonance frequency and the normalized mass of the side rail 2 according to the present embodiment and of the various side rails according to the related art.

In the side rail "a" shown in FIG. 5A, that is, in the side rail a with no reinforcement, the normalized resonance frequency cannot be obtained (see the diamond mark in FIG. 6), so that great vibrations in the vertical direction might occur in the vehicle body. In the side rail "a" shown in FIG. 5C, that is, in the side rail a having greater plate thickness dimension of the entire steel plate, the normalized mass for obtaining the normalized resonance frequency becomes greater (see the triangle mark in FIG. 6), which causes a great increase in weight of the vehicle body. Even in the side rail "a" shown in FIG. 5D, that is, in the side rail a with the reinforcements b laid on its inner surfaces, the normalized mass for obtaining the normalized resonance frequency becomes greater (see the square mark in FIG. 6), which causes a great increase in weight of the vehicle body.

To the contrary, in the side rail 2 according to the present embodiment, it is possible to decrease the normalized mass for obtaining the normalized resonance frequency (possible to set the normalized mass for obtaining the normalized resonance frequency to be smaller than those of the various side rails according to the related art; see the circle mark in FIG. 6); therefore, the side rail 2 can promote reduction in weight of the vehicle body, compared with those of the related art.

In the present embodiment, the laser welding is employed as the means for joining the base members 23, 26 and the reinforcement plate members 24, 25, 27, 28 to each other. If the base members and the reinforcement plate members are joined to each other by arc welding, welding-spatter adheres on the vicinities of the welded portions, or oxided scales are present thereon due to thermal influence; consequently, it becomes difficult to apply the coating material when antirust coating is carried out, which makes it difficult to obtain a high antirust effect. In the structure of the related art shown in FIG. 5D, because there are gaps between the panel members, it becomes difficult for the coating material to enter the gaps; therefore, in this case, it is also difficult to obtain a high antirust effect. According to the structure of the present embodiment, by employing the laser welding, welding-spatter as well as oxided scales can be suppressed. No gaps are generated between the panel members. Accordingly, the coating material is applied in a preferable manner, and thus it is possible to obtain a high antirust effect.

In the present embodiment, in the reinforcement region D, the reinforcement plate members 24, 25, 27, 28 are applied respectively throughout from the corner portions 21d, 21e, 22d, 22e to the horizontal wall portions 21b, 21c, 22b, 22c adjacent to the corner portions 21d, 21e, 22d, 22e. Accordingly, while minimizing increase in weight of the vehicle body due to employment of the reinforcement plate members 24, 25, 27, 28 having a greater plate thickness dimension than that of the base members 23, 26, it is possible to effectively enhance the bending rigidity in the vertical direction of the side rail 2.

In the present embodiment, the reinforcement region D is provided in the intermediate part 2A. This is because vibrations occurring in the side rail 2 are taken into account. That is, when vibrations in the vertical direction occurs in the vehicle body during traveling on the road having rough surfaces, or the like, a vibration node of the side rail 2 is supposed to appear in the intermediate part 2A. In the present embodiment, the reinforcement region D is defined in the intermediate part 2A that serves as the vibration node so as to increase the bending rigidity of the side rail 2, to thereby provide an effective solution for choppy ride.

Another Embodiment

The present disclosure is not limited to the above-described embodiment, and all modifications and applications encompassed within the scope of the claims and a range of equivalency therewith are possible.

For example, in the above-described embodiment, the reinforcement region D of each side rail 2 is configured by the six panel members 23 to 28. In the present disclosure, the number of the panel members configuring the reinforcement region D is not limited to specific one as far as the reinforcement plate members 24, 25, 27, 28 are applied in correspondence with at least all of the corner portions 21d, 21e, 22d, 22e. In addition, in the aforementioned embodiment, since each side rail 2 is configured in the closed-section structure in a generally rectangular shape, the side rail 2 has a structure having the corner portions 21d, 21e, 22d, 22e at the four corners. In the present disclosure, if each side rail is configured in the closed-section structure in another polygonal shape (such as a pentagonal shape), the number of the corner portions becomes different; thus, the number of reinforcement plate members to be applied becomes different depending on the number of the corner portions.

In the above-described embodiment, the material of the base members 23, 26 are the same as the material of the reinforcement plate members 24, 25, 27, 28. However, the present disclosure is not limited to this, and a material having a higher tensile strength than that of the material of the base members 23, 26 may be applied respectively to the reinforcement plate members 24, 25, 27, 28.

In the above-described embodiment, the reinforcement plate members 24, 25, 27, 28 are fitted and joined to the cutouts 23a, 23b, 26a, 26b formed in the base members 23, 26 by laser welding. However, the present disclosure is not limited to this, and openings may be formed in the base members 23, 26, and reinforcement plate members having shapes coinciding with the shapes of the openings may be fitted and joined to the openings by laser welding.

Furthermore, in the above-described embodiment, the reinforcement is not joined to the inner surface of the side rail 2. However the present disclosure is not limited to this, and such a structure that joins the reinforcement may also be employed in addition to the above-described embodiment. In this case, according to the structure of the present disclosure, the solution for choppy ride can also be provided while the reinforcement having a smaller mass is employed; therefore, also in this case, it is possible to prevent a great increase in weight of the vehicle body.

In the above-described embodiment, the laser welding is employed as the joining means, but the present disclosure is not limited to this, and various means such as arc welding may also be employed.

The present disclosure is applicable to a pair of right and left side rails extending along the longitudinal direction of the vehicle body in a rudder frame.

What is claimed is:

1. A side rail comprising:
a plurality of base members extending in a longitudinal direction of a vehicle body of a vehicle, the base members having a closed-section structure in a polygonal shape having a plurality of corner portions; and
reinforcement plate members having a greater plate thickness than a plate thickness of the base members, wherein
a part of a region in the longitudinal direction of the vehicle body of the side rail includes a reinforcement region having the closed-section structure in the polygonal shape constituted by the base members and the reinforcement plate members,
and
the reinforcement region includes joined parts where in a state in which the reinforcement plate members are fitted in fitting portions provided at positions corresponding to at least the respective corner portions in the base members, the base members and the reinforcement plate members are joined to each other, a first vertical wall portion and a second vertical wall portion that face each other in a horizontal direction, first horizontal wall portions and second horizontal wall portions that face each other in a vertical direction, and a plurality of the corner portions configuring boundary portions between the first and second vertical wall portions and the first and second horizontal wall portions, and in the reinforcement region, the reinforcement plate members are applied throughout from the corner portions to the horizontal wall portions adjacent to the corner portions; and wherein
the base member and the reinforcement player members are joined to each other by laser welding.

2. The side rail according to claim 1, wherein
the side rail includes:
a horizontal part extending in a horizontal direction along the longitudinal direction of the vehicle body within a predetermined range between an arrangement position of a front wheel of the vehicle and an arrangement position of a rear wheel of the vehicle;
a front curved part having a shape continued to a front end of the horizontal part and curved upward as the front curved part extends toward a frontward direction of the vehicle body; and
a rear curved part having a shape continued to a rear end of the horizontal part and curved upward as the rear curved part extends toward a rearward direction of the vehicle body,
and
the reinforcement region is provided in the horizontal part.

3. A side rail comprising:
a plurality of base members extending in a longitudinal direction of a vehicle body of a vehicle, the base members having a closed-section structure in a polygonal shape having a plurality of corner portions; and
reinforcement plate members having a greater plate thickness than a plate thickness of the base members, wherein
a part of a region in the longitudinal direction of the vehicle body of the side rail includes a reinforcement region having the closed-section structure in the polygonal shape constituted by the base members and the reinforcement plate members,
and
the reinforcement region includes joined parts where in a state in which the reinforcement plate members are fitted in fitting portions provided at positions corresponding to at least the respective corner portions in the base members, the base members and the reinforcement plate members are joined to each other, wherein
the base members are joined to the reinforcement plate members in such a manner that surfaces located outward in the closed-section structure among surfaces perpendicular to a plate thickness direction of the base members are flush with surfaces located outward in the closed-section structure among surfaces perpendicular to a plate thickness direction of the reinforcement plate members.

4. A manufacturing method for a side rail, the manufacturing method comprising:
forming fitting portions in a plurality of base members in a flat-plate shape, the fitting portions being formed in regions to become at least corner portions in a reinforcement region that is previously defined;
fitting reinforcement plate members in a flat-plate shape having a greater plate thickness than a plate thickness of the base members into the fitting portions;
joining the reinforcement plate members fitted in the fitting portions to the base members;
bending, together with the reinforcement plate members, the base members to which the reinforcement plate members are joined so as to form a plurality of rail members having the corner portions; and
integrally joining the plurality of rail members to each other so as to form a closed-section structure in a polygonal shape by the plurality of rail members.

5. The manufacturing method for the side rail according to claim 4, wherein
the reinforcement plate members are joined to the base members by laser welding.

* * * * *